United States Patent [19]

Kato et al.

[11] Patent Number: 5,035,463
[45] Date of Patent: Jul. 30, 1991

[54] ROOF DOOR DEVICE OF MOTOR VEHICLE

[75] Inventors: Yuichi Kato, Yokohama; Hiroshi Yoshida; Kozo Mizusawa, both of Chigasaki, all of Japan

[73] Assignee: Ohi Seisakusho Co., Ltd., Yokohama, Japan

[21] Appl. No.: 585,989

[22] Filed: Sep. 21, 1990

[30] Foreign Application Priority Data

Sep. 26, 1989 [JP] Japan .................................. 1-249988

[51] Int. Cl.⁵ .............................................. B60J 7/19
[52] U.S. Cl. .................................... 296/223; 296/146;
296/216; 296/224; 49/36; 49/280; 49/345
[58] Field of Search ............... 296/146, 223, 224, 216;
49/36, 280, 345

[56] References Cited

U.S. PATENT DOCUMENTS 2,857,198 10/1958 Himka et al. ............................ 49/36
4,301,622 11/1981 Dunsmoor ......................... 49/345 X

FOREIGN PATENT DOCUMENTS 0101821 6/1983 Japan ................................. 296/216
62-16021 1/1987 Japan .
0134330 6/1987 Japan ................................. 296/216

Primary Examiner—Dennis H. Pedder
Attorney, Agent, or Firm—Foley & Lardner

[57] ABSTRACT

A roof door device of a motor vehicle is disclosed. The vehicle has a roof and a side door operable to close a side door opening. The roof has a roof side opening which is positioned above and merged with the side door opening. A roof door is pivotally connected to the roof to open and close the roof side opening. A guide rail is mounted on the roof at a position near the roof side opening. A slider is slidable in and along the guide rail. A pivotal arm has one end pivotally connected to the roof and the other end connected to the roof door. A link member has one end pivotally connected to the slider and the other end pivotally connected to the pivotal arm, so that a movement of the slider in and along the guide rail in one direction causes folding of the pivotal arm thereby closing the roof side opening with the roof door. A pin is connected to the pivotal arm. The link member has a holding recess. The holding recess catches the pin to achieve a latched condition of the pivotal arm relative to the link member when the pivotal arm is folded to lie parallel with the link member.

17 Claims, 5 Drawing Sheets

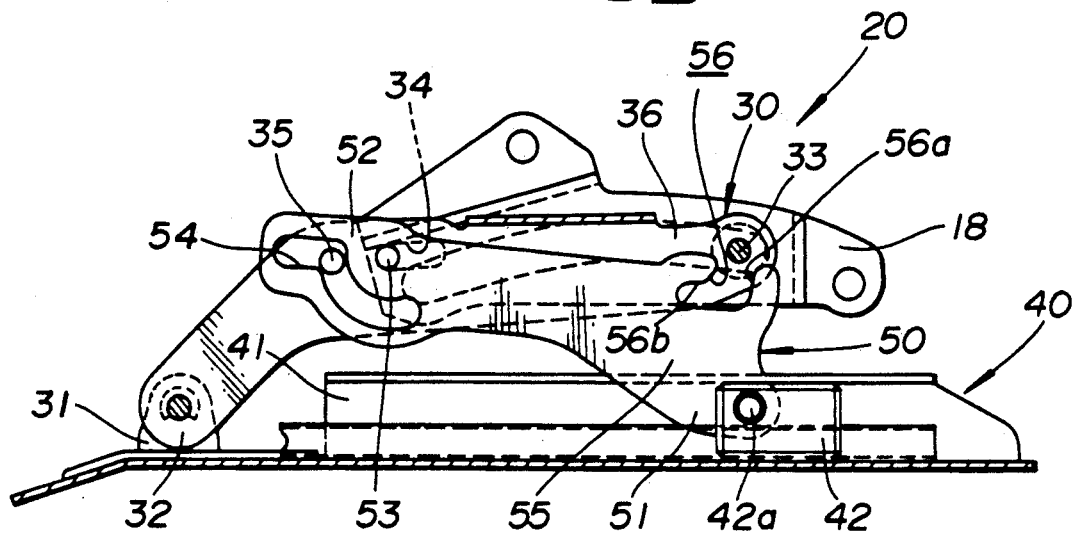
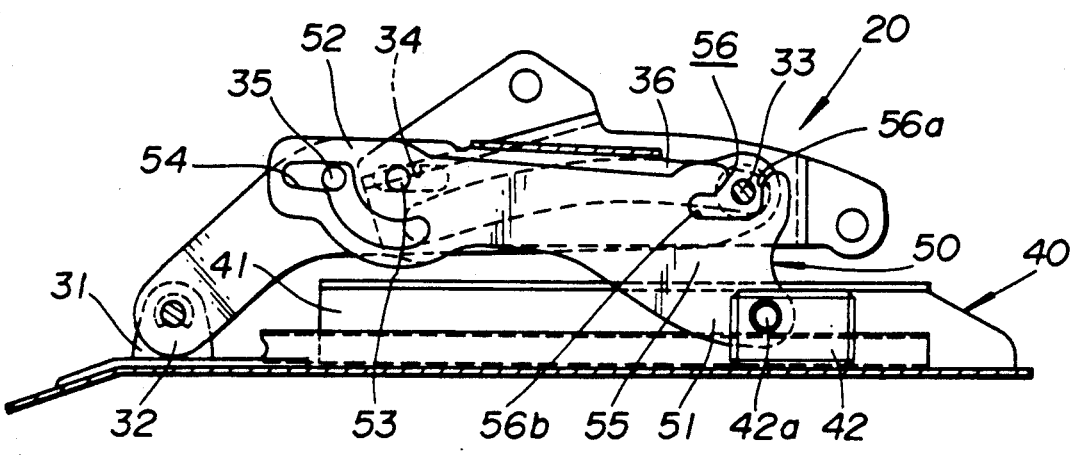
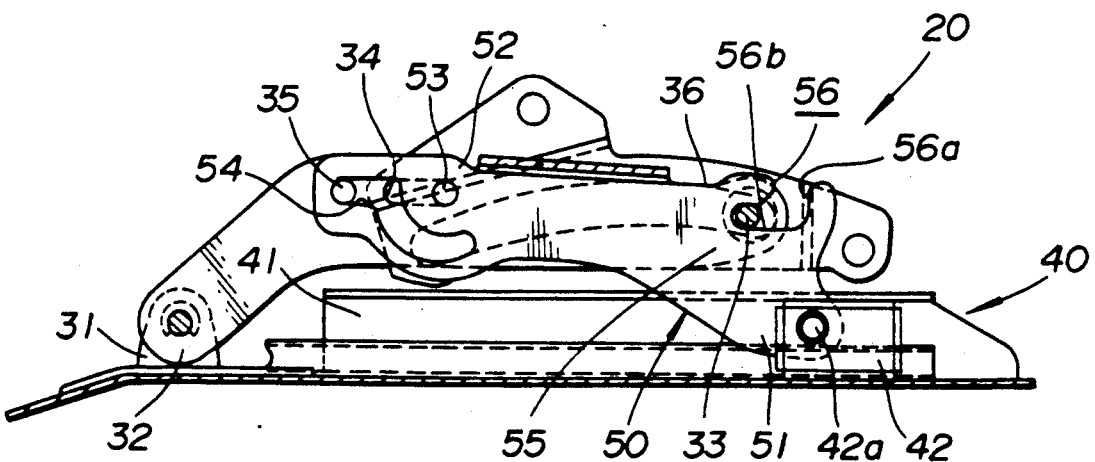

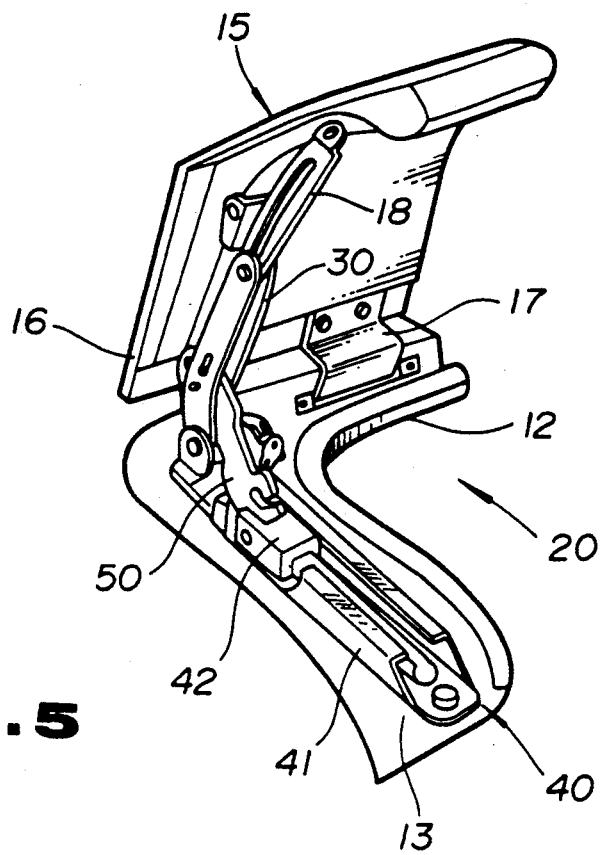
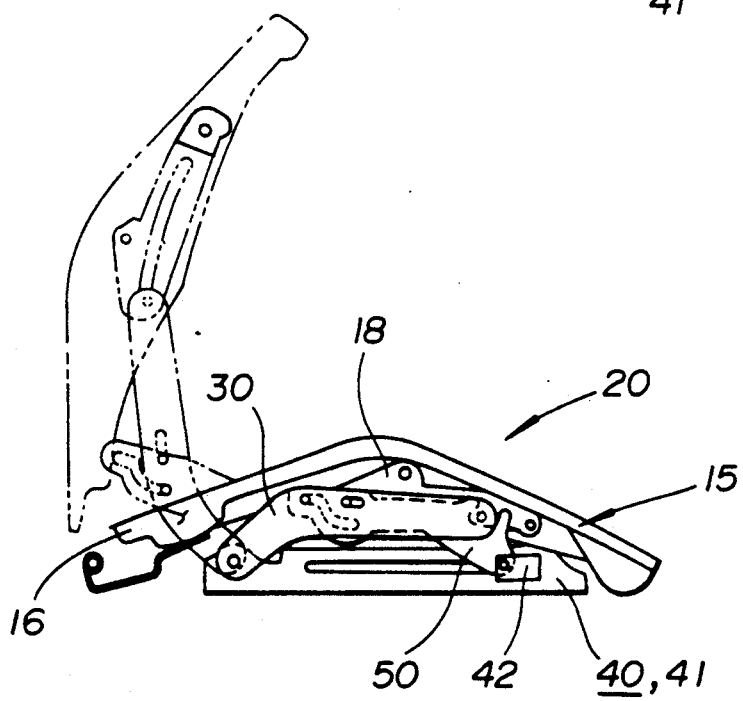

ROOF DOOR DEVICE OF MOTOR VEHICLE

BACKGROUND OF THE INVENTION

1. Field of the Invention

The present invention relates in general to roof door devices of a motor vehicle, and more particularly to roof door devices of a type which has a roof door hinged to the roof of the vehicle to open and close a roof side opening which is positioned above and merged with a side door opening of the vehicle.

2. Description of the Prior Art

In order to facilitate egress and ingress of a passenger, some motor vehicles are equipped with a roof door device which has a hinged roof door operable to open and close a roof side opening positioned above and merged with a side door opening. Upon egress or ingress, both the side door and roof door are opened to provide the vehicle body with a larger or vertically enlarged opening for the passenger. This type roof door device is very convenient when a handicapped person, aged person or person having a hat on uses the vehicle because the person needs not largely bend his or her body upon leaving or entering the vehicle. One of such roof door devices is described in Japanese Utility Model First Provisional Publication No. 62-16021.

However, the roof door devices hitherto proposed have failed not only to achieve shorter assembly time and thus reduced production cost but also to exhibit satisfactorily smoothed operation.

Particularly, in the roof door device disclosed by the Publication, a separate latch device is used along with a roof door operating device. As is apparent, mounting the two devices to the vehicle roof results in greater assembly time and thus greater cost. In fact, the assembly of them must be made by checking and adjusting the positional relationship therebetween.

SUMMARY OF THE INVENTION

It is therefore an object of the present invention to provide a roof door device which is free of the above-mentioned drawbacks.

According to the present invention, there is provided, in a motor vehicle having a roof and a side door operable to close a side door opening, a roof door device. The roof door device comprises first means defining in the roof a roof side opening which is positioned above and merged with the side door opening; a roof door pivotally connected to the roof to open and close the roof side opening; a guide rail mounted on the roof at a position near the roof side opening; a slider slidable in and along the guide rail; a pivotal arm having one end pivotally connected to the roof and the other end connected to the roof door; a link member having one end pivotally connected to the slider and the other end pivotally connected to the pivotal arm, so that a movement of the slider in and along the guide rail in a given direction causes folding of the pivotal arm thereby closing the roof side opening with the roof door; a pin connected to one of the pivotal arm and the link member; and second means defining in the other of the pivotal arm and the link member a holding recess, the holding recess catching the pin to achieve a latched condition of the pivotal arm relative to the link member when the pivotal arm is folded to lie parallel with the link member.

BRIEF DESCRIPTION OF THE DRAWINGS

Other objects and advantages of the present invention will become apparent from the following description when taken in conjunction with the accompanying drawings, in which:

FIGS. 3A to 3D are side views of the assembled essential parts of the operating mechanism, showing various conditions of the same;

FIG. 4 is a perspective but partial view of the roof door device of the invention in a condition wherein the roof door is opened; and FIG. 5 is a side view of the roof door device, showing a closed condition of the roof door by a solid line and an open condition by a phantom line.

DETAILED DESCRIPTION OF THE INVENTION

Figure 1:
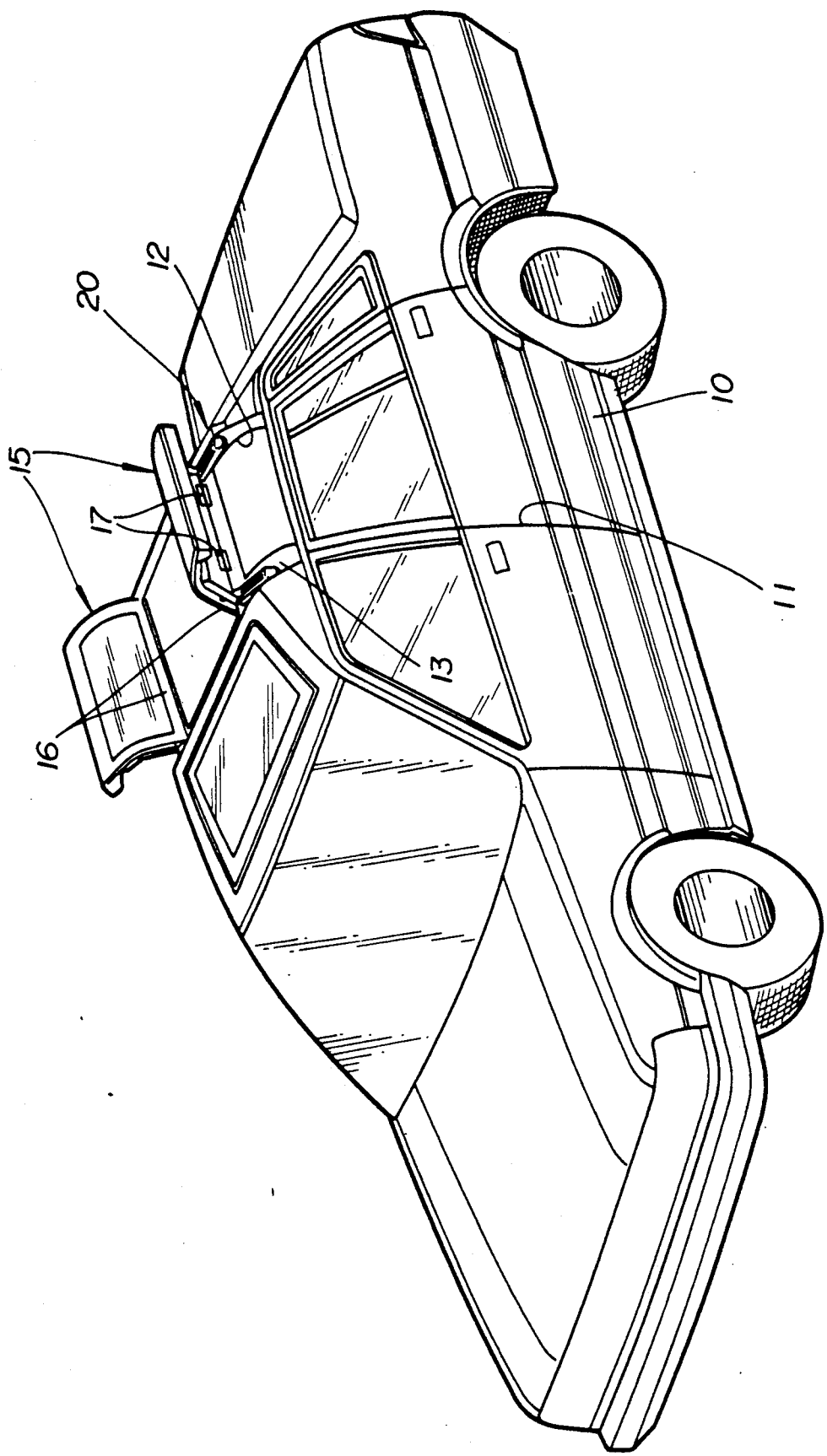
FIG. 1 is a perspective view of a passenger motor vehicle to which the present invention is practically applied.

Referring to FIG. 1 of the drawings, there is shown a motor vehicle of four-door sedan type, which has two front doors and two rear doors 10. Each rear door 10 is hinged at a front edge thereof to a center pillar to open and close a rear door opening 11.

As is shown in FIG. 1, the motor vehicle has two roof door devices 14 which are respectively and symmetrically mounted on laterally opposed portions of the vehicle roof. As shown in the drawing, roof doors 15 of the units 14 are arranged swingable like wings of a bird.

Since the two roof door devices 14 are substantially the same in construction, the following description will be directed to only the roof door device 14 which is positioned above the illustrated rear left door 10.

As shown in FIG. 1, the vehicle roof is formed with a roof side opening 12 which is positioned above and merged with the rear door opening 11. For opening and closing the roof side opening 12, the roof door 15 is pivotally connected to the roof.

As is seen from FIGS. 1 and 4, the roof door 15 has an inboard end 16 pivotally connected through two hinges 17 to the vehicle roof, so that the roof door 15 is movable like a bird's wing. As is seen from FIG. 4, the roof has around the roof side opening 12 a weather strip 12A to achieve a watertight sealing of the roof door 15 when the door 15 assumes the closed position.

For operating the roof door 15, a pair of operating mechanisms 20 are incorporated with the roof door 15.

Figure 2:
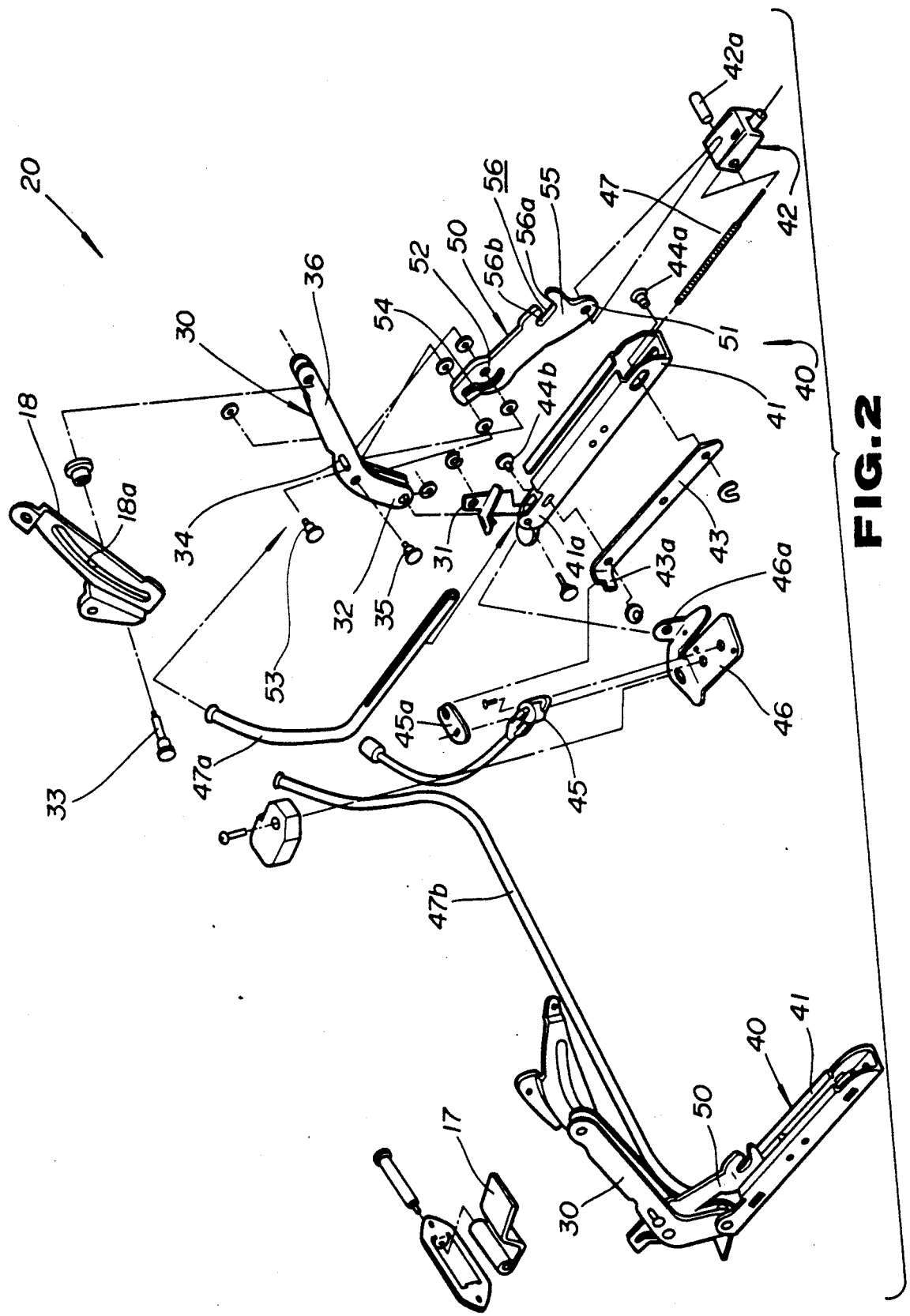
FIG. 2 is an exploded view of an operating mechanism of the roof door device of the present invention.

As is understood from FIGS. 2 and 4, each operating mechanism 20 comprises generally a pivotal arm 30 which is pivotally arranged at a front (or rear) edge portion 13 of the roof side opening 12, a slider drive unit 40 which extends along the front (or rear) edge portion 13 of the roof side opening 12, and a link member 50 which is operatively connected between the slider drive unit 40 and the pivotal arm 30.

As is seen from FIGS. 2 and 4, the pivotal arm 30 is pivotally connected at its base end portion 32 to the edge portion 13 of the roof side opening 12 through a pivot bracket 31. The roof door 15 has a mounting bracket 18 secured thereto. The mounting bracket 18 has a curved slot 18a with which a pin 33 provided at a leading end of the pivotal arm 30 is slidably engaged.

The slider drive unit 40 comprises a guide rail 41 which extends along the edge portion 13 of the roof side opening 12, a slider 42 which is slidably engaged with the guide rail 41, and a position detecting bracket 43 which is movably connected to the guide rail 41.

That is, the position detecting bracket 43 is movably connected to the guide rail 41 through position detecting pins 44a and 44b which pass through respective elongate slots (no numerals) formed in longitudinally spaced portions of a side wall portion of the guide rail 41. When the slider 42 in the guide rail 41 comes to its front or rear terminal position, the same is brought into abutment with the position detecting pin 44a or 44b inducing a slight forward or rearward movement of the position detecting bracket 43 by a distance determined by the length of the corresponding slot. The position detecting bracket 43 has a bent portion 43a operatively engaged with a forked member 45a which is fixed to a rotary shaft of a rotary switch 45. Thus, the position of the slider 42 in the guide rail 41 is detected by the degree in which the rotary shaft of the switch 45 rotates. The rotary switch 45 is held by a supporting bracket 46.

The slider 42 has a geared cable 47 fixed thereto. The geard cable 47 is slidably received in an elongate sleeve 47a or 47b in the guide rail 41 and leads to an electric drive device (not shown).

The pivot bracket 31 for the pivotal arm 30 is fixed to the inboard end of the guide rail 41. The pivot bracket 31, a raised lug 46a of the supporting bracket 46 and a flange portion 41a of the guide rail 41 constitute a supporting structure by which the base end portion 32 of the pivotal arm 30 is pivotally supported.

The link member 50 has an outboard end 51 pivotally connected through a pin 42a to the slider 42. Thus, the outboard end 51 of the link member 50 is slidable along the edge portion 13 of the roof side opening 12.

The pivotal arm 30 is formed at a generally middle portion thereof with a longitudinally extending slot 34 with which a slide pin 53 fixed to an inboard end 52 of the link member 50 is slidably engaged. The inboard end 52 of the link member 50 is formed with a guide slot 54 which consists of a semicircular slot part and an elongate slot part. The semicircular slot is formed concentric with the pin 53. A guide pin 35 is fixed to the pivotal arm 30 and slidably engaged with the guide slot 54.

As will be understood from FIGS. 3A to 3D, when the pivotal arm 30 is folded, an outboard end 55 of the link member 50 and a leading end 36 of the pivotal arm 30 are put side by side.

Figure 3A:
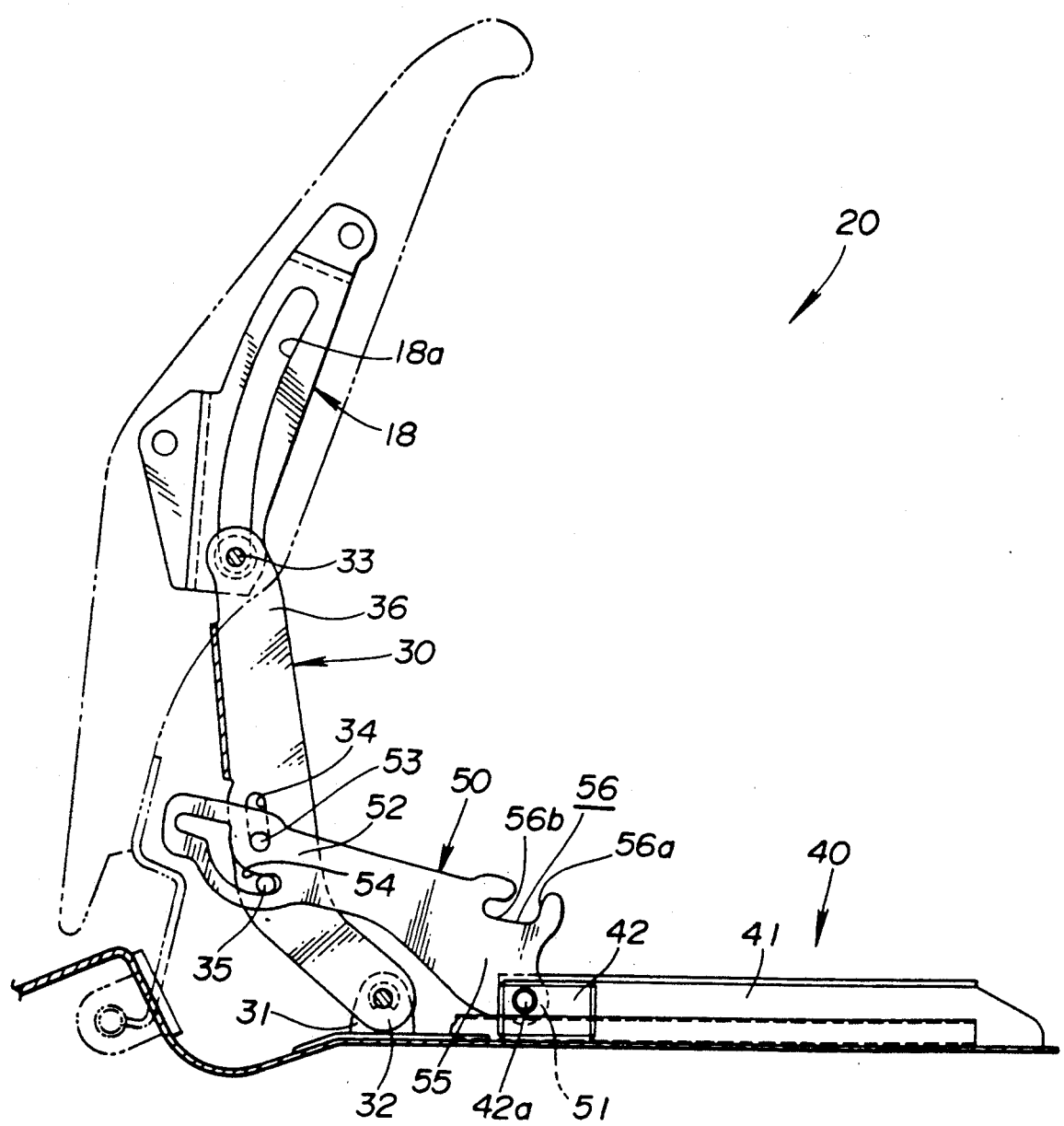

As is best seen from FIG. 3A, the outboard end 55 of the link member 50 is formed with a holding recess 56 into which the pin 33 of the pivotal arm 30 is inserted when the pivotal arm 30 is folded. The holding recess 56 consists of an entrance part 56a and a major part 56b. In order to achieve a slidable engagement with the pin 33, the major part 56b is shaped to extend longitudinally in the link member 50, as shown.

As will be understood from FIG. 3C, when the pivotal arm 30 is folded, the slot 34 of the pivotal arm 30 and the major part 56b of the recess 56 of the link member 50 lie on a common imaginary line permitting a slidable movement of the slide pin 53 and pin 33 in the corresponding slots 34 and 56b. With this, the link member 50 is slidable rightward in FIG. 3C, relative to the folded pivotal arm 30, to a position wherein the pin 33 is deeply engaged with the major part 56b of the holding recess 56 and the slide pin 53 assumes the rightmost position in the slot 34, as is seen from FIG. 3D.

In the following, operation of the roof door device of the invention will be described with reference to the drawings.

For ease of understanding, the description will be commenced with respect to a condition wherein the rear door 10 is closed and the roof door 15 is opened, as shown in FIG. 1.

Under this condition, the roof side opening 12 is opened. Thus, if the side door 10 is opened, there is produced a vertically enlarged opening which consists of the side door opening 11 and the roof side opening 12. Thus, the egress and ingress of a passenger are facilitated.

Furthermore, in the condition wherein the roof door 15 is opened, the operating mechanism 20 assumes a condition as shown in FIG. 3A. That is, the pivotal arm 30 is raised and the slider 42 is positioned at the inboard end of the guide rail 41 causing the link member 50 to support or stand the pivotal arm 30. As shown, the pin 33 of the pivotal arm 30 assumes the lowermost position of the curved slot 18a of the mounting bracket 18, the guide pin 35 of the pivotal arm 30 assumes the lowermost position of the guide slot 54 of the link member 50 and the slide pin 53 of the link member 50 assumes the lowermost position of the slot 34 of the pivotal arm 30.

When now it is intended to close the roof door 15, a roof door control switch (not shown) is manipulated. Upon this, the electric drive device (not shown) is energized to draw out the geared cable 47, so that the slider 42 slides in the guide rail 41 toward the outboard end of the guide rail 41. Due to the sliding of the slider 42, the link member 50 is moved toward the outboard end of the guide rail 41 while folding the pivotal arm 30 toward the outboard end of the guide rail 41.

That is, at a first stage of this movement of the link member 50, the engagement between the pin 53 of the link member 50 and the slot 34 of the pivotal arm 30 serves to pull the pivotal arm 30 toward the outboard end of the guide rail 41 without inducing a sliding movement of the pin 53 in the slot 34. This is because, at such first stage, the pin 35 is forced to to move in the semicircular part of the slot 54.

During the pivoting movement of the pivotal arm 30, the pin 33 of the pivotal arm 30 is forced to slide in the curved slot 18a of the mounting bracket 18 toward a leading end of the slot 18a while pivoting the roof door 15 in a closing direction.

When, as is seen from FIG. 3B, the pivotal arm 30 is folded, the link member 50 is also folded and overlapped with the folded pivotal arm 30 causing the outboard end 55 of the link member 50 and the leading end 36 of the pivotal arm 30 to be put side by side. When the link member 50 and the pivotal arm 30 are almost folded up, the pin 33 of the pivotal arm 30 enters the holding recess 56 of the link member 50 through the entrance part 56a of the same and the slot 34 of the pivotal arm 30 lies in parallel with the guide rail 41, as shown in FIG. 3C.

When the slider 42 further moves in the same direction and finally comes to its outmost position, the link member 50 is further drawn by the slider 42 permitting the pins 53 and 33 to slide in the slot 34 and the holding recess 56 respectively and finally comes to its outermost position as shown in FIG. 3D. In this condition, the folded pivotal arm 30 is latched by the link member 50, and thus, the roof door 15 is latched to close the roof side opening 12.

When, under this latched condition, an external force is applied to the pivotal arm 30 in a direction to raise the same, the pin 33 on the leading end of the pivotal arm 30 is pressed against an upper edge of the major part 56b of the holding recess 56 thereby preventing a raising movement of the pivotal arm 30. Thus, the latched closed condition of the roof door 15 is maintained.

As will be understood when viewing the conditions depicted by FIGS. 3A to 3D, during the above-mentioned folding of the pivotal arm 30, the guide pin 35 of the. pivotal arm 30 is forced to slide in the guide slot 54 of the link member 50 toward the other end of the slot 54.

When the slider 42 comes to the outmost position in a manner as is described hereinabove, the same abuts against the position detecting pin 44a causing an outward movement of the position detecting bracket 43. Thus, the rotary switch 45 is actuated by the bracket 43 and issues an information signal representing that the roof door 15 is fully closed.

When now it is intented to open the roof door 15, the roof door control switch (not shown) is manipulated. Upon this, the electric drive device (not shown) is energized to draw or pull the geared cable 47 toward thereto, so that the slider 42 slides in the guide rail 41 toward the inboard end of the guide rail 41. Due to this sliding of the slider 42, the link member 50 instantly comes to the position where the pin 33 of the pivotal arm 33 is disengageable from the holding recess 56, as is understood from FIG. 3C.

When the slider 42 is further slided due to continued operation of the drive device, the link member 50 pushes and slightly raises the pivotal arm 30 disengaging the pin 33 from the holding recess 56, as is understood from FIG. 3B.

When the slider 42 is brought to its innermost position, the link member 50 fully raises the pivotal arm 30 and thus the roof door 15, as is understood from FIGS. 3A and 4.

When the slider 42 comes to the innermost position in the above-mentioned manner, the same abuts against another position detecting pin 44b causing an inboard movement of the position detecting bracket 43. Thus, the rotary switch 45 is actuated by the bracket 43 and issues an information signal representing that the roof door 15 is fully opened.

As will be understood from the foregoing description, the roof door device of the present invention can smooth the opening and closing movement of the hinged roof door 15. Furthermore, due to the unique structure possessed by the device, the roof door 15 can be latched automatically when assuming a fully closed position. Furthermore, since the roof door device of the invention has a roof door latching mechanism as a unit, assembly of the same to the vehicle roof is easily achieved, unlike the case of the conventional roof door device disclosed in the aforementioned Japanese Publication.

What is claimed is:

1. In a motor vehicle having a roof and a side door operable to close a side door opening,
   a roof door device comprising:
   first means defining in said roof a roof side opening which is positioned above said side door opening;
   a roof door pivotally connected to said roof to open and close said roof side opening;
   a guide rail mounted on said roof at a position near said roof side opening;
   a slider slidable in and along said guiderail ;
   a pivotal arm having one end pivotally connected to said roof and the other end connected to said roof door;
   a link member having one end pivotally connected to said slider and the other end pivotally connected to said pivotal arm, so that a movement of said slider in and along said guide rail in a given direction causes folding of said pivotal arm thereby closing said roof side opening with said roof door;
   a first pin connected to one of said pivotal arm and said link member; and
   second means defining in the other of said pivotal arm and said link member a holding recess, said holding recess catching said first pin to achieve a latched condition of said pivotal arm relative to said link member when said pivotal arm is folded to lie parallel with said link member.

2. A roof door device as claimed in claim 1, in which said first pin is possessed by said pivotal arm and said holding recess is defined by said link member.

3. A roof door device as claimed in claim 2, in which said holding recess is formed in said link member near said one end of the same.

4. A roof door device as claimed in claim 3, in which said holding recess is so shaped as to achieve the latched condition of said pivotal arm when said first pin is moved in a given direction in said holding recess.

5. A roof door device as claimed in claim 4, in which said holding recess includes an entrance part and a major part which are connected and merged with each other, said major part extending toward the other end of said link member.

6. A roof door device as claimed in claim 5, further comprising a mounting bracket which is secured to said roof door, said mounting bracket having a curved slot with which said first pin is slidably engaged.

7. A roof door device as claimed in claim 6, further comprising a pivot means which includes:
   a second pin fixed to the other end of said link member; and
   third means defining in said pivotal arm a longitudinally extending slot with which said second pin is slidably engaged.

8. A roof door device as claimed in claim 7, further comprising a guide means which includes:
   a third pin fixed to said pivotal arm; and
   fourth means defining in the other end of said link member a guide slot with which said third pin is slidably engaged, said guide slot including a semicircular slot part and an elongate slot part.

9. A roof door device as claimed in claim 8, in which said semicircular slot part of said guide slot is formed concentric with said second pin.

10. A roof door device as claimed in claim 1, further comprising drive means which includes:
    a geared cable having one end connected to said slider, said geared cable extending along said guide rail;

11. A roof door device as claimed in claim 1, further comprising position detecting means which includes:
    first and second position detecting pins movably connected to longitudinally spaced portions of said guide rail in such an arrangement that when said slider moves along said guide rail in one and the other directions, the slider is brought into abutment with said first and second position detecting pins to move the same;

a position detecting bracket held by said first and second position detecting pins to move therewith, said position detecting bracket having a bent portion; and an electric switch actuated by said bent portion of said position detecting bracket.

12. A roof door device as claimed in claim 11, further comprising a forked member which is fixed to a rotary shaft of said rotary switch, said forked member pivotally catching said bent portion of said position detecting bracket.

13. In a motor vehicle having a roof and a side door operable to close a side door opening, a roof door device comprising:

means defining in said roof a roof side opening which is positioned above said side door opening;

a roof door pivotally connected to said roof to open and close said roof side opening;

a guide rail mounted on said roof at a position near said roof side opening;

a slider slidable in and along said guide rail;

a pivotal arm having one end pivotally connected to said roof and the other end equipped with a first pin, said pivotal arm having a longitudinally extending slot formed therethrough;

a mounting bracket secured to said roof door, said mounting bracket having a curved slot with which said first pin is slidably engaged;

a link member having one end pivotally connected to said slider and the other end equipped with a second pin which is slidably engaged with said longitudinally extending slot of said pivotal arm;

means defining in said one end of said link member a holding recess, said holding recess catching and latching said first pin when said pivotal arm is folded to lie parallel with said link member and thereafter said link member moves in a given direction relative to the folded pivotal arm.

14. A roof door device as claimed in claim 13, further comprising:

a third pin fixed to said pivotal arm; and means defining in the other end of said link member a guide slot with which said third pin is slidably engaged, said guide slot including a semicircular slot part and an elongate slot part, said semicircular slot part being formed concentric with said second pin.

15. A roof door device as claimed in claim 14, further comprising drive means which includes:

a geared cable having one end connected to said slider, said geared cable extending along said guide rail;

16. A roof door device as claimed in claim 15, further comprising position detecting means which includes:

first and second position detecting pins movably connected to longitudinally spaced portions of said guide rail in such an arrangement that when said slider moves along said guide rail in one and the other directions, the slider is brought into abutment with said first and second position detecting pins to move the same;

a position detecting bracket held by said first and second position detecting pins to move therewith, said position detecting bracket having a bent portion; and an electric switch actuated by said bent portion of said position detecting bracket.

17. A roof door device as claimed in claim 16, further comprising a forked member which is fixed to a rotary shaft of said rotary switch, said forked member pivotally catching said bent portion of said position detecting bracket.

* * * * *